United States Patent
Ko

(10) Patent No.: US 12,325,474 B2
(45) Date of Patent: Jun. 10, 2025

(54) REDUCER FOR VEHICLE STEERING DEVICE

(71) Applicant: HL MANDO CORPORATION, Pyeongtaek (KR)

(72) Inventor: Bong Sung Ko, Yongin (KR)

(73) Assignee: HL MANDO CORPORATION, Pyeongtaek (KR)

( * ) Notice: Subject to any disclaimer, the term of this patent is extended or adjusted under 35 U.S.C. 154(b) by 691 days.

(21) Appl. No.: 17/685,306

(22) Filed: Mar. 2, 2022

(65) Prior Publication Data
US 2022/0281517 A1  Sep. 8, 2022

(30) Foreign Application Priority Data
Mar. 2, 2021 (KR) .......................... 10-2021-0027270

(51) Int. Cl.
*B62D 5/04* (2006.01)
*B62D 3/04* (2006.01)
(52) U.S. Cl.
CPC ............. *B62D 5/0454* (2013.01); *B62D 3/04* (2013.01); *B62D 5/0409* (2013.01)
(58) Field of Classification Search
CPC ...... B62D 5/0409; B62D 5/0454; B62D 3/04; B62D 3/02; F16D 3/76; F16D 3/06; F16C 2326/24; F16C 27/066; F16H 1/16; F16H 2057/0213; B60R 21/2037; B60Y 2410/102

USPC ........................... 180/444; 74/425, 411, 461
See application file for complete search history.

(56) References Cited

U.S. PATENT DOCUMENTS

| 10,030,711 B2 * | 7/2018 | Mathie ...................... F16D 1/02 |
| 2005/0072620 A1 * | 4/2005 | Joushita ............... B62D 5/0409 180/444 |
| 2011/0147113 A1 * | 6/2011 | Ko .......................... F16H 57/039 180/444 |
| 2012/0111657 A1 * | 5/2012 | Hamakita ............. F16H 57/022 180/444 |

FOREIGN PATENT DOCUMENTS

WO   WO-2020004897 A1 *  1/2020  ............... B62D 3/04

* cited by examiner

*Primary Examiner* — Jacob D Knutson
*Assistant Examiner* — Morgan Rappe
(74) *Attorney, Agent, or Firm* — Harvest IP Law, LLP

(57) ABSTRACT

The present embodiments relate to a reducer for a vehicle steering device. According to the present embodiments, there may be provided a reducer for a vehicle steering device, comprising a worm shaft having a gear part, geared with a worm wheel, on an outer circumferential surface thereof, bearings individually fitted over two opposite side portions of the worm shaft, and dampers coupled to axially support at least one of the bearings and limited in axially elastically deformed length when assembled in a reducer housing.

12 Claims, 12 Drawing Sheets

REDUCER FOR VEHICLE STEERING DEVICE

CROSS-REFERENCE TO RELATED APPLICATION

This application claims priority from Korean Patent Application No. 10-2021-0027270, filed on Mar. 2, 2021, which is hereby incorporated by reference for all purposes as if fully set forth herein.

BACKGROUND

Field

The present embodiments relate to a reducer fora vehicle steering device.

Description of Related Art

In general, a vehicle steering device controls driving of a motor by an electronic control unit provided in a vehicle according to vehicle driving conditions and, as the rotational force of the worm shaft by the driving of the motor is added to the rotational force of the steering wheel of the driver's manipulation through a reduce, maintains the driver's steering control smoothly and stably.

However, conventional reduces for vehicle steering devices may cause a gap due to wear to the worm and worm wheel rotated by motor driving, and noise may occur at the gap-caused portion.

To address these issues, a damper is installed on one end of the worm shaft to provide elastic force in the axial direction of the worm shaft and thereby minimize noise. A method for fixing a damper to the reducer housing using a lock nut and a plug bolt has been proposed.

However, the elastically deformable maximum distance of the conventional damper is determined by the peripheral components, such as the lock nut and the plug bolt, and rattling noise occurs due to large deviations in elastic deformation force and deformation range depending on the manufacturing errors and assembly errors of the peripheral components. The driver may feel uncomfortable when manipulating the steering wheel due to the rattling noise and impact transferred through the wheels and the steering shaft from the road.

BRIEF SUMMARY

The present embodiments may provide a reducer for a vehicle steering device, which may reduce rattling noise caused by an increase in backlash due to wear to the worm and worm wheel or by the impact transferred from the road through the wheels and steering wheel and reduce the rotational resistance and the stuck feeling of the worm shaft and bearing to thereby allow the driver a better steering experience.

According to the present embodiments, there may be provided a reducer for a vehicle steering device, comprising a worm shaft having a gear part, geared with a worm wheel, on an outer circumferential surface thereof, bearings individually fitted over two opposite side portions of the worm shaft, and dampers coupled to axially support at least one of the bearings and limited in axially elastically deformed length when assembled in a reducer housing.

According to the present embodiments, it is possible to provide a reducer for a vehicle steering device, which may reduce rattling noise caused by an increase in backlash due to wear to the worm and worm wheel or by the impact transferred from the road through the wheels and steering wheel and reduce the rotational resistance and the stuck feeling of the worm shaft and bearing to thereby allow the driver a better steering experience.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
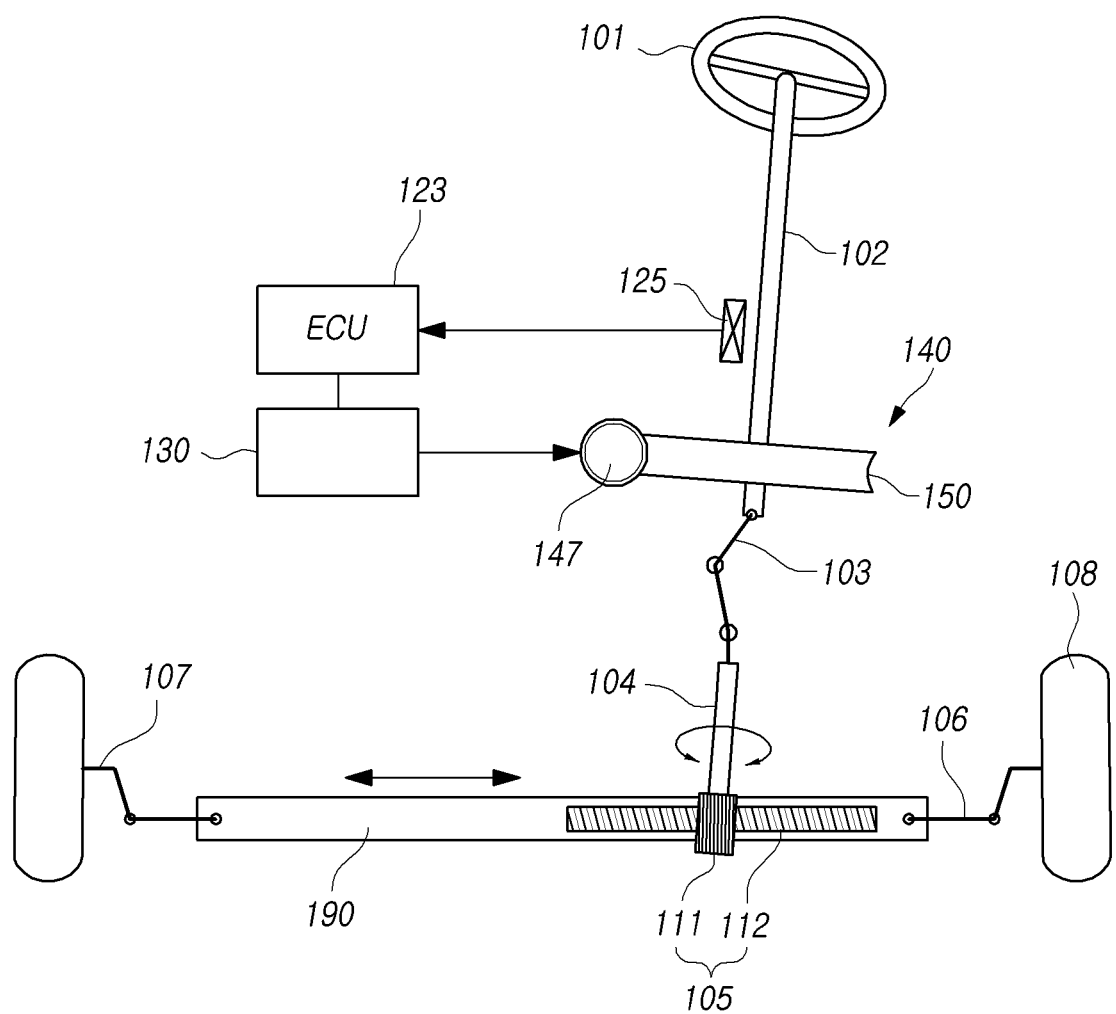
FIGS. 1 and 2 are views schematically illustrating a vehicle steering device according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
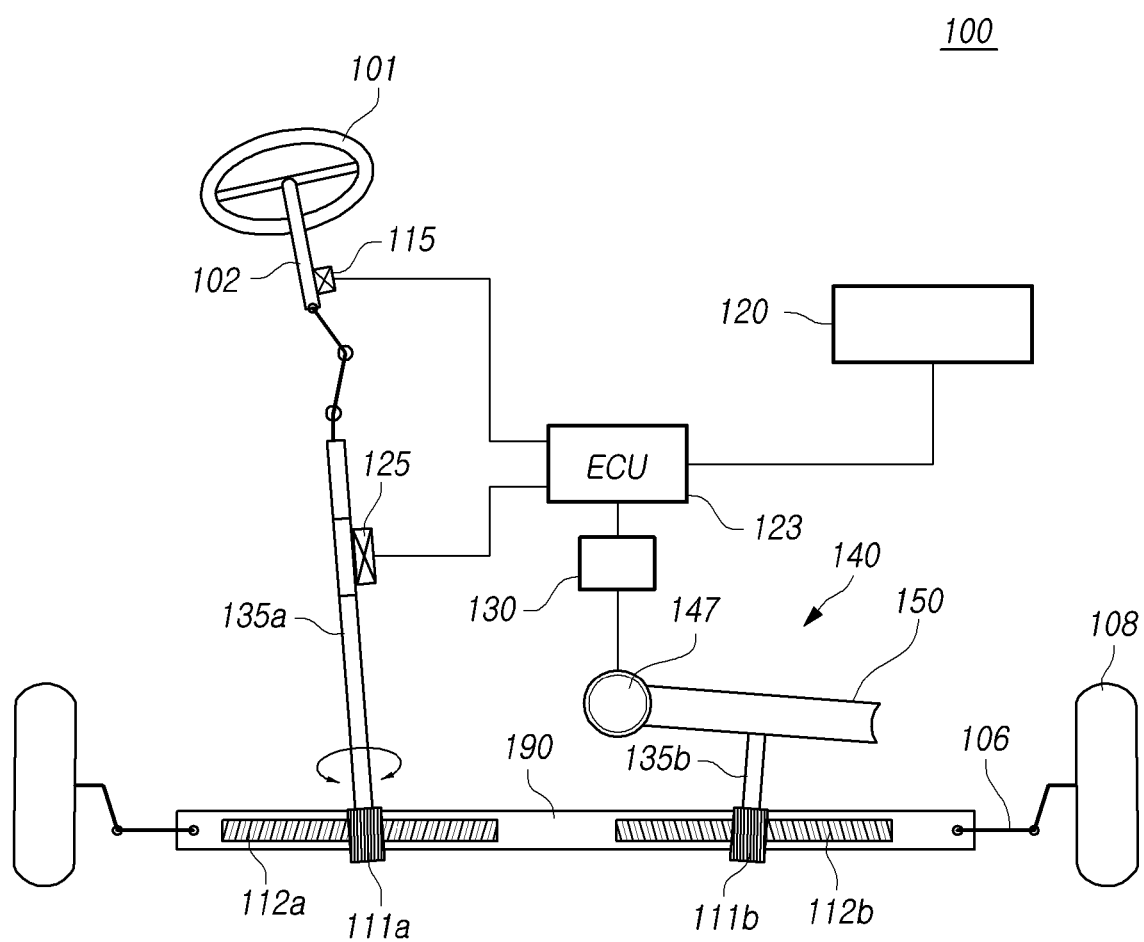
Figure 3:
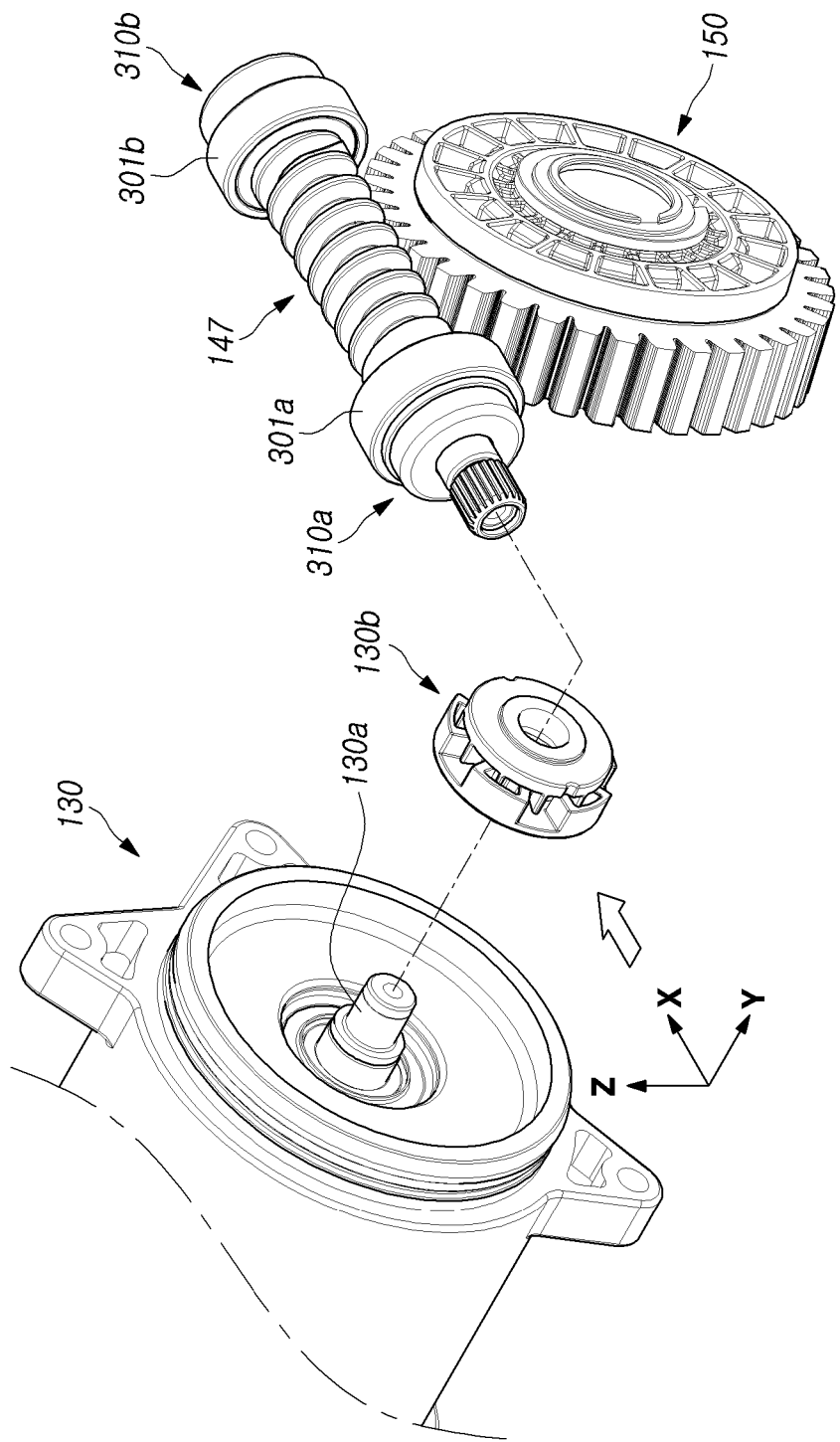
FIGS. 3 and 4 are exploded perspective views illustrating a portion of a reducer for a vehicle steering device according to the present embodiments.
Figure 4:
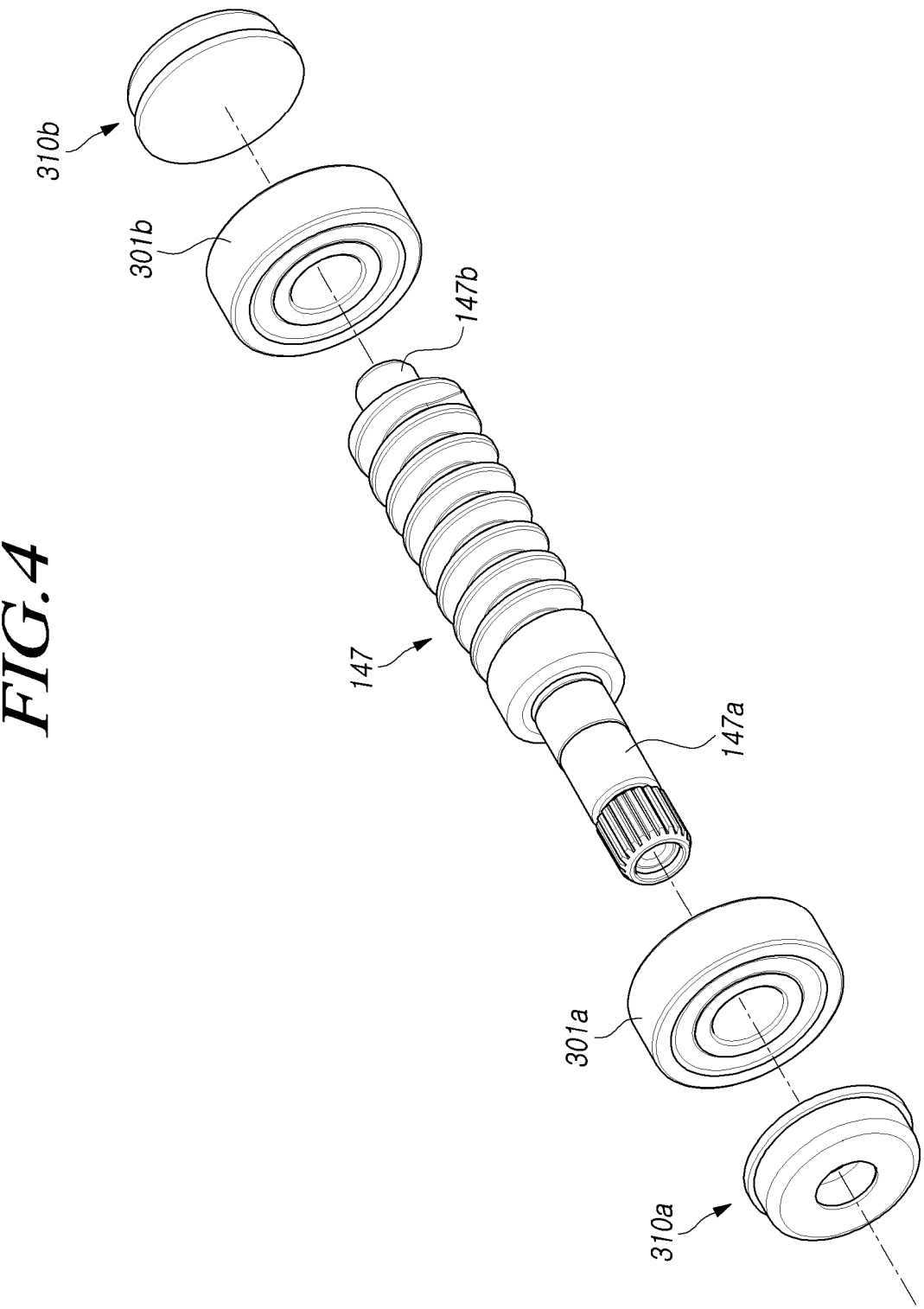
Figure 10:
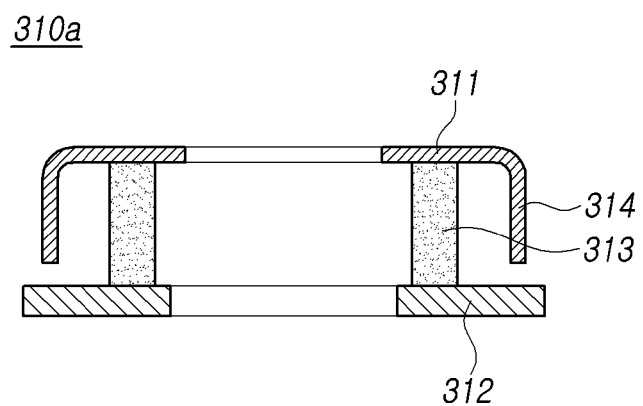
FIGS. 10 and 11 are cross-sectional views illustrating a damper according to the present embodiments.
Figure 11:
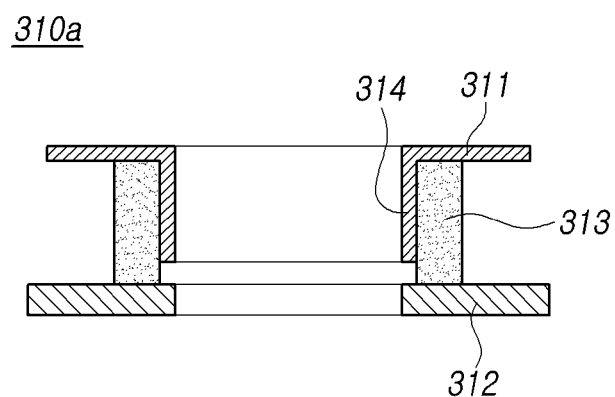
Figure 12:
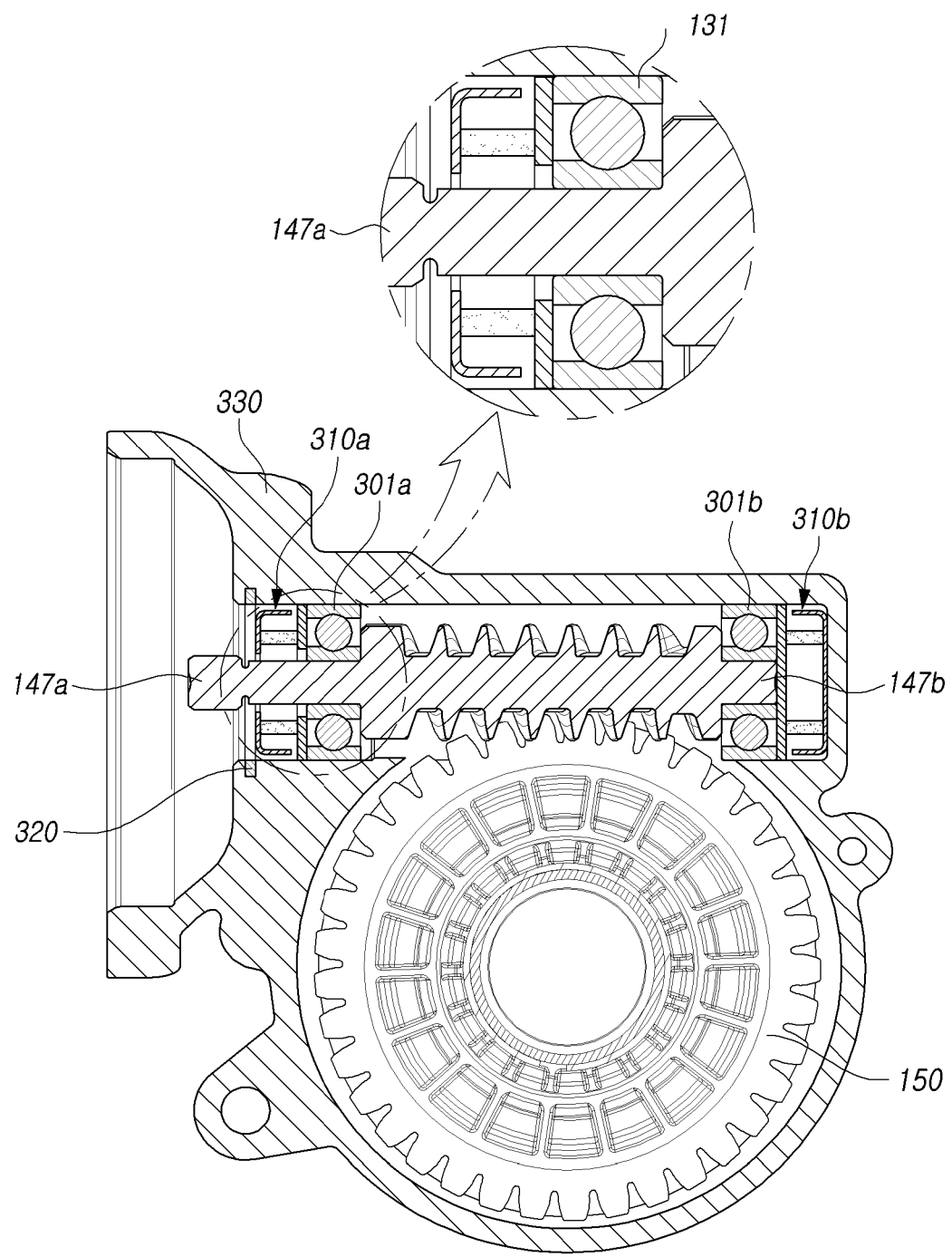
FIG. 12 is a cross-sectional view illustrating a structure of a reducer for a vehicle steering device with a damper applied thereto, according to the present embodiments.

FIGS. 1 and 2 are views schematically illustrating a vehicle steering device according to the present embodiments. FIGS. 3 and 4 are exploded perspective views illustrating a portion of a reducer for a vehicle steering device according to the present embodiments. FIGS. 5, 6, 7, 8, and 9 are perspective views illustrating a structure of a damper according to the present embodiments. FIGS. 10 and 11 are cross-sectional views illustrating a damper according to the present embodiments. FIG. 12 is a cross-sectional view illustrating a structure of a reducer for a vehicle steering device with a damper applied thereto, according to the present embodiments.

As shown in the drawings, according to the present embodiments, a reducer for a vehicle steering device includes a worm shaft 147 having a gear part, geared with a worm wheel 150, on an outer circumferential surface thereof, bearings 301a and 301b fitted over two opposite side portions of the worm shaft 147, and dampers 310a and 310b coupled to axially support at least one of the bearings 301a and 301b and limited in axially elastically deformed length when a reducer housing 330 is assembled.

Referring to FIGS. 1 and 2, the vehicle steering device includes a steering shaft 102 connected from a steering wheel 101 to two wheels 107 and 108, a reducer 140 including a worm shaft 147 and a worm wheel 150, a pinion shaft 104, 111a, and 111b, and a rack bar 190.

One side of the steering shaft 102 is connected to the steering wheel 101 to rotate along with the steering wheel 101, and the other side thereof is connected to the pinion shaft 104 via a pair of universal joints 103 to steer the wheels 108 via the rack bar 190

Referring to FIG. 1, one pinion shaft 104 is connected to the rack bar 190 through a rack-pinion mechanism 105, and two opposite ends of the rack bar 190 are connected to the wheels 108 of the vehicle through tie rods 106 and knuckle arms.

The rack-pinion mechanism 105 has a pinion gear 111, formed on the pinion shaft 104, and a rack gear 112, formed in the outer circumferential surface of one side of the rack bar 190, geared with each other and, by the torque generated when the driver manipulates the steering wheel 101, steers the wheels 108 through the rack-pinion mechanism 105 and the tie rods 106.

An auxiliary power mechanism includes a torque sensor 125 detecting the torque applied to the steering wheel 101 by the driver and outputting an electrical signal proportional to the detected torque, an electronic control unit 123 generating control signals based on electrical signals received from various sensors, e.g., the torque sensor 125 and a steering angle sensor, a motor 130 generating auxiliary power based on the signal received from the electronic control unit 123, and a reducer 140 transferring the auxiliary power generated from the motor 130 to the steering shaft 102.

Referring to FIG. 2, if the driver turns the steering wheel 101, the steering shaft 102 rotates. Thus, a first pinion gear 111a of a first pinion shaft 135a connected with the steering shaft 102 meshes with a first rack gear 112a formed in the rack bar 190, and the rotative motion of the first pinion gear 111a is converted into the left-right linear motion of the rack bar 190 to steer the wheels 108 through the tie rods 106.

As detection means to assist the driver's steering force, the torque sensor 125, a steering angle sensor 115, and a vehicle speed sensor 120 are provided. If the driver turns the steering wheel 101 so torque is generated at the steering shaft 102, the torque sensor 125 detects the torque, the steering angle sensor 115 detects the turning angle of the steering wheel 101, and the vehicle speed sensor 120 detects the vehicle speed, converts it into an electrical signal, and transfers the electrical signal to the electronic control unit 123.

The electronic control unit 123 performs computation on the electrical signals received from various sensors and transfers them to the motor 130. The motor 130, the reducer 140, and a second pinion shaft 135b having a second pinion gear 111b geared with a second rack gear 112b are rotated by the torque, rotation angle, and vehicle speed received from the electronic control unit 123, so that steering assist force is provided to the rack bar 190 having the second rack gear 112b.

In the reducer for the vehicle steering device, the worm shaft 147 and the worm wheel 150 are meshed with each other and rotated by the driving force of the motor 130, rotating the steering shaft 102 or the pinion shaft 104, 111a, and 111b and hence assisting the driver's steering force. A first bearing 301a is fitted over a first side portion 147a of the worm shaft 147 which is coupled with a shaft 130a of the motor 130 via a coupler 130b, and a second bearing 301b is fitted over a second side portion 147b of the worm shaft 147. The first bearing 301a and the second bearing 301b support rotation of the worm shaft 147.

Dampers 310a and 310b are coupled to axially support at least any one of the bearings 301a and 301b to absorb impact and vibration transferred to the worm shaft 147, preventing rattling noise. In this case, the dampers 310a and 310b are provided such that their axially elastically deformed length is limited when assembled in the reducer housing 330.

As shown in FIGS. 3 and 4, the dampers 310a and 310b may be provided at the respective sides of the bearings 301a and 301b, but are not limited thereto. For example, a damper 310a or 310b may be provided only at the first side portion 147a of the worm shaft 147, coupled to the shaft 130a of the motor 130, or only at the second side portion 147b. Although the drawings for the present embodiments illustrate that the bearings 301a and 301b are coupled to two opposite sides, this is merely an example, and the present embodiments are not limited thereto, as described above.

Referring to FIGS. 3 and 4, a through hole may be provided in the first damper 310a provided at the first side portion 147a of the worm shaft 147, coupled to the shaft 130a of the motor 130. The through hole may be larger in diameter than the worm shaft 147. Accordingly, the worm shaft may be inserted through the through hole of the first damper 310a.

No through hole may be formed in the second damper 310b provided at the second side portion 147b of the bearing 301b as shown in FIG. 4, but is not limited thereto. As an example, a through hole may also be formed in the second damper 310b provided at the second side portion 147b of the worm shaft 147, and the worm shaft may be inserted through the through hole of the second damper 310a.

Whether the second damper 310b has a through hole, like the first damper 310a, may differ, but the second damper 310b may have the same configuration and material as the first damper 310a. Although described below are embodiments of the first damper 310a with a through hole, the embodiments are also applicable to the second damper 310b with no through hole.

Referring to FIGS. 5 to 9, the first damper 310a includes a first supporting member 311 and a second supporting member 312, which face each other and are axially spaced apart from each other, and an elastic member 313 supported and coupled between the first supporting member 311 and the second supporting member 312 and elastically deformed according to the interval between the first supporting member 311 and the second supporting member 312.

The first supporting member 311 may have a protrusion 314 projecting to the second supporting member 312. The protrusion 314 limits the axially elastically deformed length when the first damper 310a is assembled in the reducer housing 330.

Figure 5:
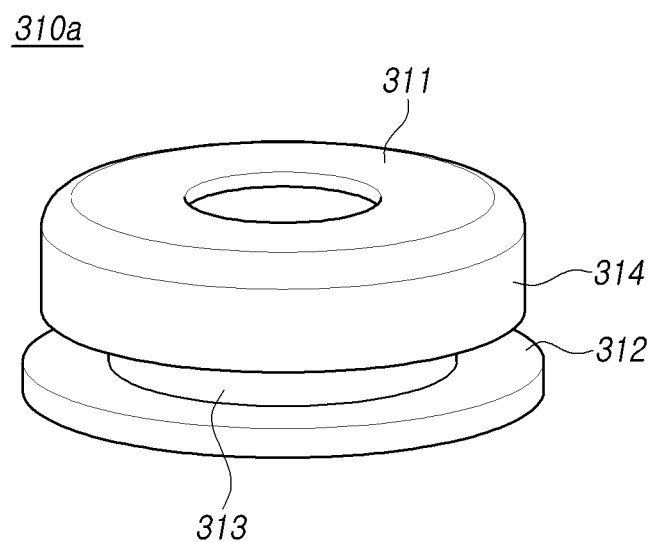
FIGS. 5, 6, 7, 8, and 9 are perspective views illustrating a structure of a damper according to the present embodiments.

Referring to FIG. 5, the protrusion 314 may be shaped as a ring that axially extends from the outer circumferential surface of the radial end of the first supporting member 311. However, embodiments of the disclosure are not limited thereto.

Figure 6:
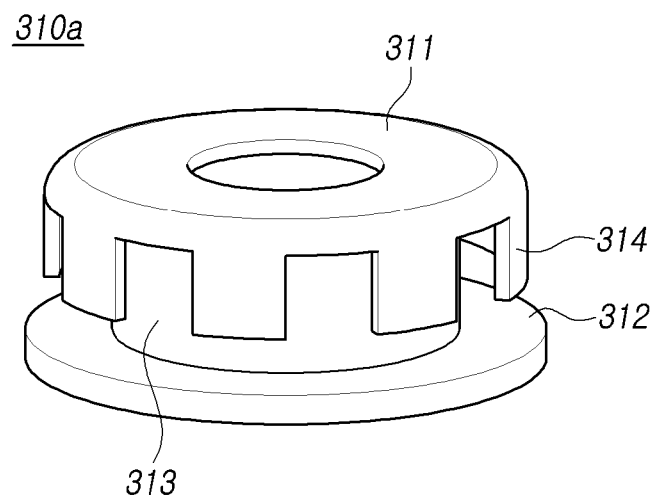

For example, as shown in FIG. 6, a plurality of protrusions 314 may be provided that extend from the outer circumferential surface of the radial end of the first supporting member 311 and are spaced apart from each other in the circumferential direction of the first supporting member 311. As the protrusions 314 are provided which are spaced apart from each other, although unexpected large impact is transferred, e.g., as the wheels hit a curb or stone while the vehicle travels, the protrusion 314 may be elastically deformed to spread radially, absorbing the impact.

Further, the plurality of protrusions 314 are not limited in shape as long as they may contact and support the second supporting member 312 when the first damper 310a is assembled in the reducer housing 330. For example, the plurality of protrusions may be shaped as a plurality of circular poles or a plurality of trapezoids.

The elastic member 313 may be spaced apart from the protrusion 314, and an end of the protrusion 314 may be spaced apart from the second supporting member 312. The spacing between the end of the protrusion 314 and the second supporting member 312 may be a distance to which the axial elastic deformation is limited when the first damper 310a is assembled in the reducer housing 330. As the spacing is limited, excessive compression of the elastic member 313 may be prevented, and so is a decrease in the elastic deformation performance of the first damper 310a and the second damper 310b.

Figure 7:
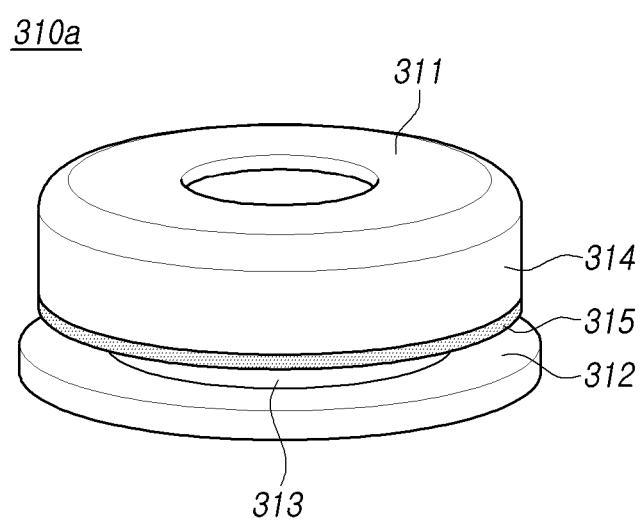
Figure 8:
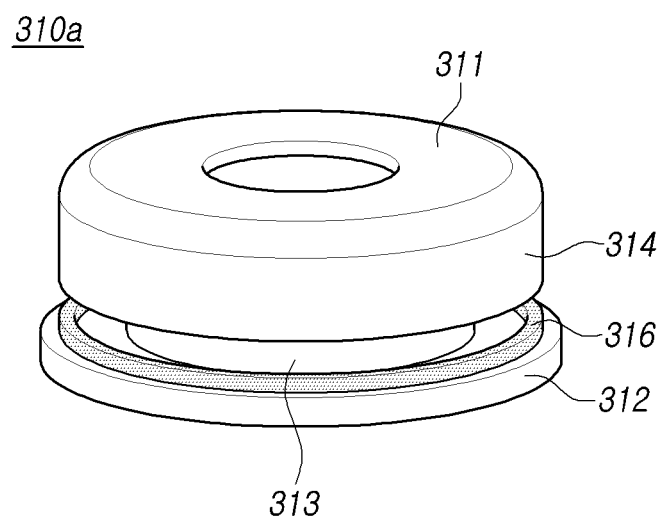

Referring to FIGS. 7 and 8, a cushioning member 315 or 316 may further be provided between the end of the protrusion 314 and the second supporting member 312.

For example, the second supporting member 312 may have a first cushioning member 315 in a position facing the protrusion 314, and the end of the protrusion 314 may be spaced apart from the first cushioning member 315. As another example, the end of the protrusion 314 provided in the first supporting member 311 may be provided with a second cushioning member 316, and the second cushioning member 316 may be spaced apart from the second supporting member 312. However, without limited thereto, the first cushioning member 315 and the second cushioning member 316 both may be provided in the end of the protrusion 314 provided in the first supporting member 311 and the second supporting member 312 facing the protrusion, and the first cushioning member 315 and the second cushioning member 316 may be spaced apart from each other. In this case, the spacing may be a distance to which axial elastic deformation is limited when the first damper 310a is assembled in the reducer housing 330.

Therefore, as the cushioning members 315 and 316 are provided, it is possible to remove or reduce noise that may occur between the end of the protrusion 314 and the second supporting member 312 when an unexpected significant load is transferred, e.g., the wheels hitting a curb or stone, and to prevent deformation or damage to the protrusion 314 and the second supporting member 312.

The cushioning members 315 and 316 may be formed of a material large in rigidity than the elastic member 313. When a normal load is transferred to the vehicle, the elastic member 313 may absorb the load and, when an unexpected large load is transferred to the vehicle, the elastic member 313 and the cushioning members 315 and 316 may simultaneously absorb the large load.

The first supporting member 311 and the second supporting member 312 may be formed of a metal or plastic material. The first supporting member 311 and the second supporting member 312 may be formed of an engineered plastic material, such as polyacetal (POM), polyamide (PA), polycarbonate (PC), polyimide (PI) and polybutylene terephthalate (PBT), as well as a metal material, such as steel, to absorb impact and vibration.

The elastic member 313 may be formed of rubber, urethane, Teflon, or silicone. For example, the elastic member 313 may be formed of natural rubber (NR), nitrile butadiene rubber (NBR), chloroprene rubber (CR), ethylene propylene terpolymer (EPDM), fluoro rubber (FPM), styrene butadiene rubber (SBR), chlorosulphonated polyethylene (CSM), urethane, Teflon, or silicone that has weather resistance and elasticity as well as elasticity, to absorb noise and vibration.

At least one of the first supporting member 311 or the second supporting member 312 may be integrally formed with the elastic member 313. For example, the first supporting member 311 and the elastic member 313 may be integrally injection-molded and be coupled to the second supporting member 312 provided with a fastening part (not shown). As another example, the second supporting member 312 and the elastic member 313 may be integrally injection-molded and be coupled to the first supporting member 311 provided with a fastening part (not shown). As another example, the first supporting member 311, the second supporting member 312, and the elastic member 313 all may be integrally injection-molded and provided.

Figure 9:
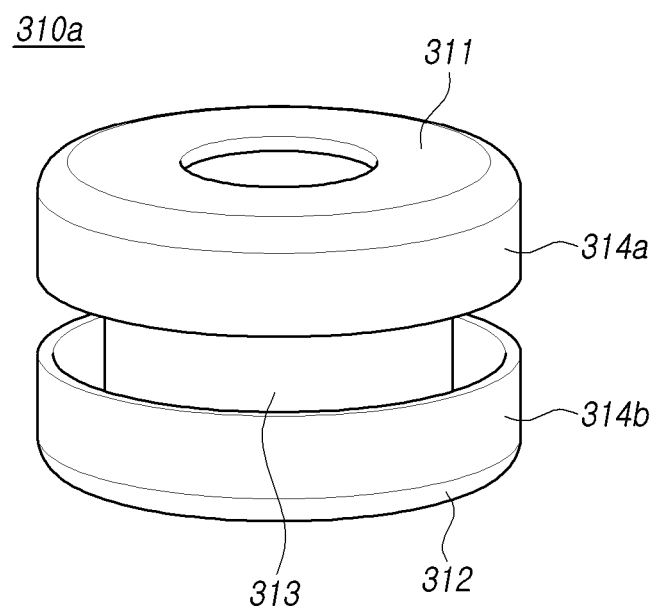

Referring to FIG. 9, the first supporting member 311 and the second supporting member 314 may be provided with protrusions 314a and 314b axially projecting to face each other. The protrusions 314a and 314b may extend from the outer circumferential surfaces of the respective radial ends of the first supporting member 311 and the second supporting member 312. The protrusion 314a of the first supporting member 311 and the protrusion 314b of the second supporting member 312 may be shaped as circular rings. However, the protrusions 314a and 314b are not limited in shape as long as their shapes are complementarily engaged with each other. In this case, the protrusion 314a formed in the first supporting member 311 and the protrusion 314b formed in the second supporting member 312 may be spaced apart from each other.

Referring to FIG. 10, the radial thickness of the protrusion 314 provided in the first supporting member 311 may be smaller than the radial thickness of the second supporting member 312. Accordingly, when the elastic member is elastically deformed, the protrusion 314a formed in the first supporting member 311 is contacted and supported by the second supporting member 312, limiting the elastically deformed length to prevent further elastic deformation.

Referring to FIG. 11, in the elastic member 313, a through hole may be formed in the center, and the protrusion 314 may be provided by being inserted into the inner surface of the through hole, and the end of the protrusion 314 may be provided to be spaced apart from the second supporting member 312. The spacing between the end of the protrusion 314 and the second supporting member 312 may be a distance to which axial elastic deformation is limited when the first damper 310a is assembled in the reducer housing 330.

Referring to FIG. 12, the elastic member 313 is elastically deformed by the distance between the protrusion 134 and the second supporting member 312 and is assembled in the reducer housing 330.

In other words, when the dampers 310a and 310b are assembled in the reducer housing 330, the distance between the protrusion 314 and the second supporting member 312 may be reduced by the elastic deformation of the elastic member 313, but the protrusion 314 and the second supporting member 312 are assembled in the reducer housing 330, spaced apart from each other.

The first damper 310a provided at the side portion 147a of the worm shaft 147, coupled with the shaft 130a of the motor 130, may be axially supported by a fixing member 320 coupled in a fixed position of the reducer housing 330. The first supporting member 311 of the first damper 310a may be supported by the fixing member 320, and the second supporting member 312 of the first damper 310a may be supported by the first bearing 301a. In other words, the first damper 310a may be axially supported by the fixing member 320 and the first bearing 301a and be prevented from escaping off.

The fixing member 320 may be a snap ring or an O-ring, but is not limited thereto. The fixing member 320 may be any component that is coupled in a fixed position of the reducer housing 330 to prevent the first damper 310a from escaping off. The first supporting member 311 of the second damper 310b, coupled to the second side portion 147b of the worm shaft 147, may be supported by the inner circumferential surface of the reducer housing 330, and the second supporting member 312 of the second damper 310b may be supported by the second bearing 301b. In other words, the second damper 310b may be axially supported by the inner circumferential surface of the reducer housing 330 and the second bearing 301b and be prevented from escaping off.

According to the present embodiments, it is possible to provide a reducer for a vehicle steering device, which may reduce, through a damper whose elastically deformed length is limited, rattling noise caused by an increase in backlash due to wear to the worm and worm wheel or by the impact transferred from the road through the wheels and steering wheel and reduce the rotational resistance and the stuck feeling of the worm shaft and bearing to thereby allow the driver a better steering experience.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A reducer for a vehicle steering device, comprising:
   a worm shaft having a gear part, geared with a worm wheel, on an outer circumferential surface thereof;
   bearings individually fitted over two opposite side portions of the worm shaft; and
   dampers coupled to axially support at least one of the bearings and limited in axially elastically deformed length when assembled in a reducer housing,
   wherein the dampers include:
   a first supporting member and a second supporting member having flat shapes and axially facing and spaced apart from each other; and
   an elastic member coupled to be supported between the first supporting member and the second supporting member and elastically deformed depending on a change in interval between the first supporting member and the second supporting member,
   wherein the first supporting member includes a protrusion toward the second supporting member,
   wherein the second supporting member includes a first cushioning member in a position facing an end of the protrusion, and wherein the end of the protrusion is spaced apart from the first cushioning member.

2. The reducer of claim 1, wherein the dampers are individually coupled to the bearings, wherein among the dampers, a damper provided at a side portion of the worm shaft, coupled with a motor shaft, has a through hole, and wherein the through hole is larger in diameter than the worm shaft to allow the worm shaft to be inserted therethrough.

3. The reducer of claim 1, wherein the protrusion extends from an outer circumferential surface of a radial end of the first supporting member.

4. The reducer of claim 1, wherein the protrusion include a plurality of protrusions extending from an outer circumferential surface of a radial end of the first supporting member and spaced apart from each other in a circumferential direction of the first supporting member.

5. The reducer of claim 1, wherein the elastic member is spaced apart from the protrusion, and wherein an end of the protrusion is spaced apart from the second supporting member.

6. The reducer of claim 1, wherein the first supporting member and the second supporting member are formed of a metal or plastic material.

7. The reducer of claim 1, wherein the elastic member is formed of rubber, urethane, Teflon, or silicone.

8. The reducer of claim 1, wherein at least one of the first supporting member or the second supporting member is integrally formed with the elastic member.

9. The reducer of claim 1, wherein the first supporting member and the second supporting member, respectively, include protrusions axially facing and projecting to each other, and wherein the protrusion of the first supporting member is spaced apart from the protrusion of the second supporting member.

10. The reducer of claim 1, wherein the elastic member includes a through hole in a center thereof, wherein the protrusion is inserted through the through hole, and wherein an end of the protrusion is spaced apart from the second supporting member.

11. The reducer of claim 1, wherein in a damper provided at a side portion of the worm shaft, coupled with a motor shaft, among the dampers, the first supporting member is axially supported by a fixing member coupled to a reducer housing.

12. A reducer for a vehicle steering device, comprising:
a worm shaft having a gear part, geared with a worm wheel, on an outer circumferential surface thereof;
bearings individually fitted over two opposite side portions of the worm shaft; and
dampers coupled to axially support at least one of the bearings and limited in axially elastically deformed length when assembled in a reducer housing, wherein the dampers include:

a first supporting member and a second supporting member having flat shapes and axially facing and spaced apart from each other; and an elastic member coupled to be supported between the first supporting member and the second supporting member and elastically deformed depending on a change in interval between the first supporting member and the second supporting member, wherein the first supporting member includes a protrusion toward the second supporting member, wherein a second cushioning member is provided at an end of the protrusion of the first supporting member, and wherein the second cushioning member is spaced apart from the second supporting member.

* * * * *